United States Patent
Page

(10) Patent No.: US 9,641,517 B1
(45) Date of Patent: May 2, 2017

(54) SYSTEM AND METHOD FOR SECURE COMMUNICATIONS

(71) Applicant: Charles Schwab & Co., Inc., San Francisco, CA (US)

(72) Inventor: William Page, San Francisco, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 377 days.

(21) Appl. No.: 14/217,123

(22) Filed: Mar. 17, 2014

(51) Int. Cl.
*H04L 29/00* (2006.01)
*H04L 29/06* (2006.01)

(52) U.S. Cl.
CPC .................................. *H04L 63/083* (2013.01)

(58) Field of Classification Search
CPC ................................ G06F 21/34; H04L 9/321
USPC .............................................. 726/8; 713/171
See application file for complete search history.

(56) References Cited

U.S. PATENT DOCUMENTS

| | | | |
|---|---|---|---|
| 2007/0118891 A1* | 5/2007 | Buer ....................... | G06F 21/34 726/8 |
| 2014/0068266 A1* | 3/2014 | Cismas .................. | H04L 9/321 713/171 |

* cited by examiner

*Primary Examiner* — Brandon Hoffman
*Assistant Examiner* — Michael D Anderson
(74) *Attorney, Agent, or Firm* — Innovation Partners; Charles E. Gotlieb

(57) ABSTRACT

A system and method provides security features for inter-computer communications. After a user has proved an association with one of several firms, a user identifier of the user that cannot be used to log the user in to a data consolidating system is received by a matching system from the data consolidating system. The validity of the user and the firm is checked at the matching system and, in response to the checking, the user identifier is converted to a different user identifier and the different user identifier is provided to a data providing system by the matching system. The data providing system provides the data of the user in response, and the matching system forwards the data to the data consolidating system.

14 Claims, 6 Drawing Sheets

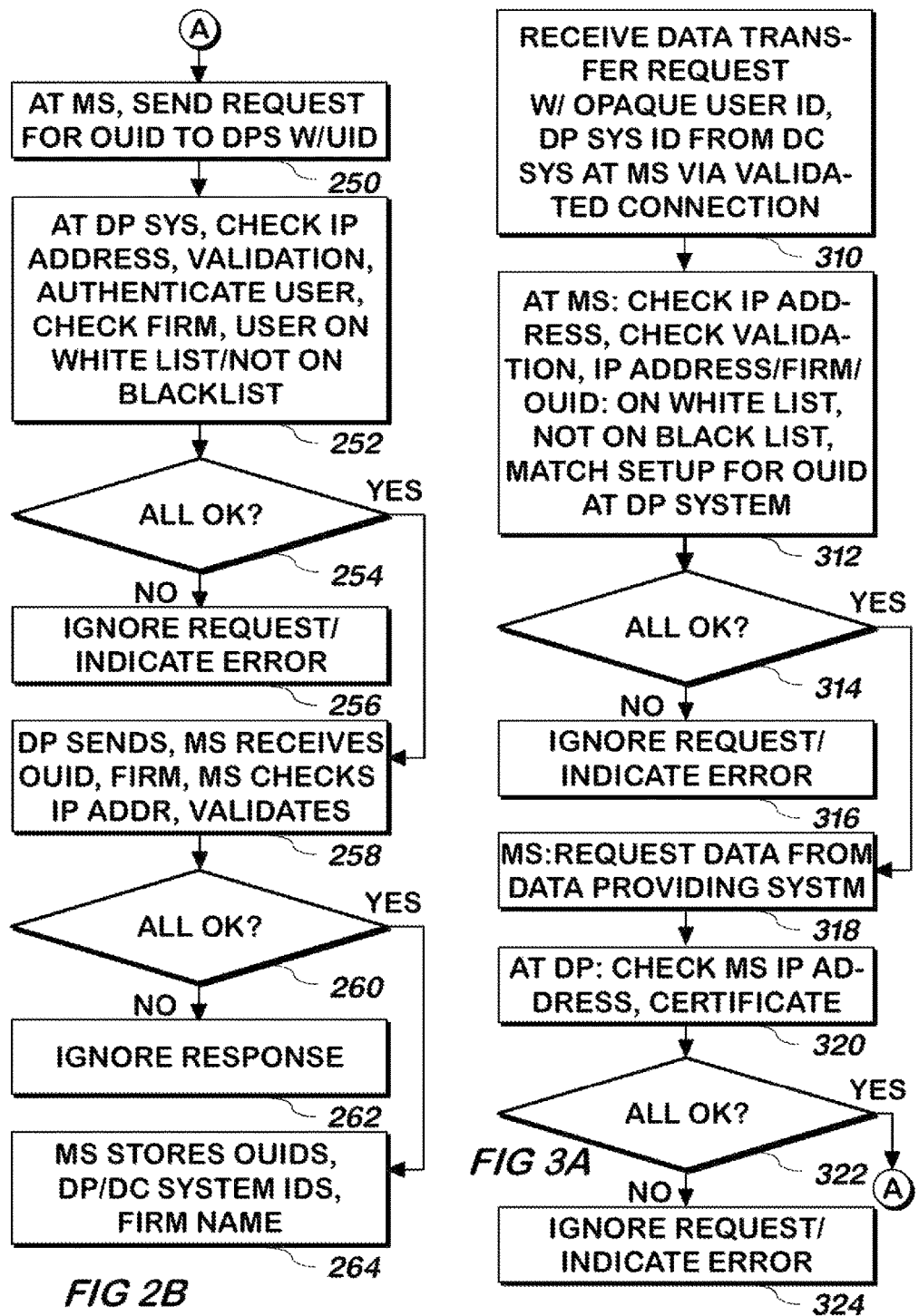

SYSTEM AND METHOD FOR SECURE COMMUNICATIONS

RELATED APPLICATIONS

This application claims the benefit of U.S. Provisional Patent Application Ser. No. 61/852,392 entitled, "Method and Apparatus for Secure Communications" filed on Mar. 15, 2013 by William Page, and this application is related to the subject matter of U.S. patent application Ser. No. 13/686,688 entitled, "System and Method for Receiving Information Among Computer Systems Without Enabling Log Ins if the User Identifiers are Compromised" filed on Nov. 27, 2012 by William Page, which claims the benefit of U.S. Provisional Patent Application Ser. No. 61/563,814 entitled, "Method and Apparatus for Receiving Information Among Computer Systems Without Enabling Log Ins if the User Identifiers are Compromised" filed on Nov. 27, 2011 by William Page, and U.S. patent application Ser. No. 13/775,087 entitled, "System and Method for Synchronizing Account Information on Two Different Computer Systems Coupled Via a Network" filed on Feb. 22, 2013 by William Page, which claims the benefit of U.S. Provisional Patent Application Ser. No. 61/601,988 Entitled, "Method and Apparatus for Synchronizing Account Information on Two Different Computer Systems Coupled Via a Network filed by William Page on Feb. 22, 2012, and is a continuation in part of U.S. patent application Ser. No. 13/686,688 entitled, "System and Method for Receiving Information Among Computer Systems Without Enabling Log Ins if the User Identifiers are Compromised" filed on Nov. 27, 2012 by William Page, which claims the benefit of U.S. Provisional Patent Application Ser. No. 61/563,814 entitled, "Method and Apparatus for Receiving Information Among Computer Systems Without Enabling Log Ins if the User Identifiers are Compromised" filed on Nov. 27, 2011 by William Page, each having the same assignee as this application and incorporated herein by reference in its entirety.

FIELD OF THE INVENTION

The present invention is related to computer software and more specifically to computer software for security over network communications.

BACKGROUND OF THE INVENTION

Communication between computer systems is described in the related applications. Such communication may be suboptimal from a security standpoint.

SUMMARY OF INVENTION

A system and method receives user account data requests from a first computer system and requests the account data from a second computer system. The request is made using an identifier of the user corresponding to the data request via a user identifier that is different from the user identifier used by the user to log to the second computer system and the second computer system will not allow a user to log in using the identifier used to make the date transfer request and is not known by the first computer system.

In one embodiment, each user account at the second computer system may be associated with a firm, when the user provides credentials that validate the user's association with the firm, with one or more user's associated with each firm. The system and method that requests the data from the second computer system receives the firm associated with a user that has requested to set up data transfer via a response to such request. The system and method receives from the second computer system a list of approved firms and a list of disapproved users, and will only request data transfer from a user's one or more accounts at the second computer system if the user is associated with an approved firm and not on a list of unapproved users.

The system and method also communicates using encrypted connections that are validated using digital certificates, and via white lists and black lists of IP addresses. In one embodiment, a communications received from IP addresses other than those on a white list are not responded to, and in another embodiment, such communications may be responded to for a limited period of time if the sender's IP address is not on the white list but is authenticated via a certificate, provided the sender's IP address is not on a black list.

The system and method described herein may be used to secure any inter computer communication described in either related application.

DETAILED DESCRIPTION OF A PREFERRED EMBODIMENT

Figure 1:
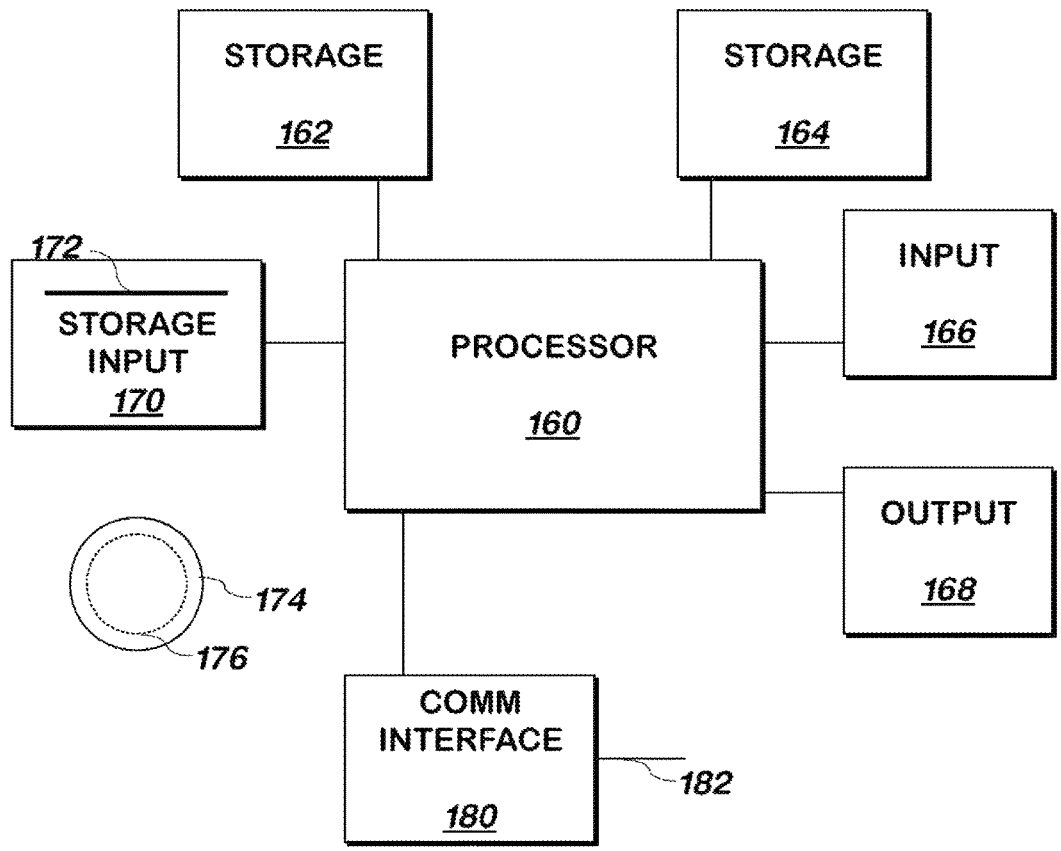
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below. All elements indicated as storage may include memory or disk storage and may include a conventional database.

In one embodiment, each computer system 150 is a conventional SUN MICROSYSTEMS T SERIES SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a DROID 2 mobile telephone commercially available from MOTOROLA CORPORATION of Schaumberg, Ill. running the ANDROID operating system commercially available from GOGGLE, INC. of Mountain View, Calif. Various computer systems may be employed, with the various computer systems communicating with one another via the Internet, a conventional cellular telephone network, an Ethernet network, or all of these.

Figure 2A:
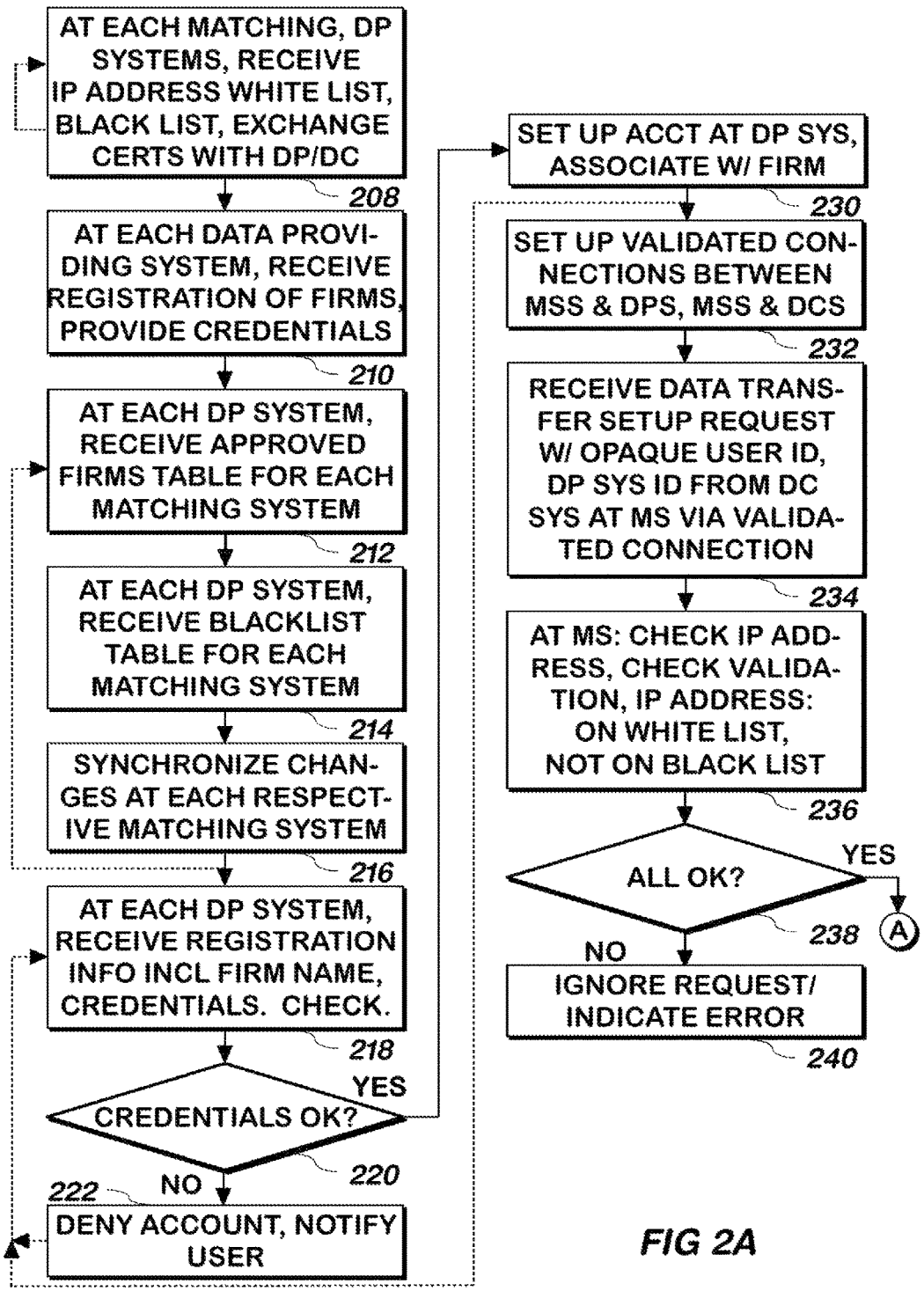
FIG. 2, consisting of FIGS. 2A and 2B, is a flowchart illustrating a method of setting up secure data transfer according to one embodiment of the present invention.

FIG. 2, consisting of FIGS. 2A and 2B, is a flowchart illustrating a method for setting up secure data transfer according to one embodiment of the present invention.

At Each Matching System and Data Providing System, Receive IP Address White List and/or Black List, and Matching System Exchanges Certificates with Data Providing Systems and Data Consolidating Systems.

Referring now to FIG. 2, one or more IP address white lists and/or black lists are received at each of any matching systems and each of any data providing systems 208. In one embodiment, an IP address white list for a matching system includes a list of valid IP addresses of data providing systems and data consolidating systems with which the matching system is approved to communicate, as described below, and an IP address black list includes a list of IP addresses with which the matching system is not approved to communicate. The IP address white list(s) received at each data providing system may receive include the IP address(es) corresponding to the matching system(s) from which such data providing system is approved to receive data transfer setup and data transfer requests, as described below and in the related application, and also approved to transfer data to, as described below and in the related application.

Each matching system may also exchange public/private key certificates with each data providing system and each data consolidating system with which such matching system is approved to communicate via the IP address(es) included in its IP address white list. Any such certificates exchanged are stored at both the matching system and the corresponding data providing system or data consolidating system.

At Each Data Providing System, Receive Registration of Firms, Provide Credentials.

Firm registration is received and/or updated from any number of firms at each data providing system, and different credentials are provided to registering firms and stored associated with each such firm 210. In one embodiment, a firm is a business entity that will use the data providing system, and one or several firms may use a data providing system where each firm is not controlled by or under control of another firm an entity controlling another firm. In one embodiment, firm registration received at each data providing system includes a firm identifier and any other firm information. Credentials information provided to any registering firm may include a firm password that may be requested from any users requesting to register accounts associated with the firm, as described below. Firm registration information, including credentials information, is stored associated with the firm identifier. In one embodiment, firm registration for any number of firms may be received and/or updated at any time, and any registered firms may also be unregistered at any time as part of step 210.

At Each Data Providing System, Receive Approved Firms Table for Each Matching System.

At each data providing system, an approved firms table corresponding to each matching system is received and/or updated and stored at the data providing system 212. In one embodiment, the approved firms table (which may be referred to as the "firms white list") corresponding to any matching system received at a data providing system includes the firm identifier(s) corresponding to the firm(s) on whose behalf data may be requested from the data providing system via each matching system. In one embodiment, a firm is automatically added to the approved firms table for a matching system when the firm is registered at the data providing system as part of step 210, or a firm may be added to the approved firms table for a matching system only when the first request for a data transfer setup, described below, corresponding to the firm is received at the data providing system via that matching system. Any firm may be manually removed from the approved firms table for a matching system as part of step 212, and any registered firm included in the approved firms table that becomes unregistered as part of step 210 above is removed from the approved firms table.

At Each Data Providing System, Receive Blacklisted Users Table for Each Matching System.

Also at each data providing system, a blacklisted users table is received and/or updated and stored for each matching system 214, for example, from a system administrator. The blacklisted users table corresponding to a matching system includes a list (which may be referred to as a "user black list") of users on whose behalf data transfer may not be requested from the data providing system via the matching system.

Synchronize Changes at Each Respective Matching System.

Any firms white list and/or black list information, and/or any updated firms white list or black list information, corresponding to each matching system is synchronized at such matching system by sending it there, where it is received and stored 216.

At Each Data Providing System, Receive Registration Information Including Firm Name and Credentials, and Check Credentials.

At any time, user registration information, including a user identifier and password, and optionally an associated firm identifier and credentials information for that firm, is received from any number of users at each data providing system 218. In one embodiment, credentials information received from the user for the firm are compared with credentials information previously stored for the firm as part of step 210 above to check whether the credentials information provided matches the credentials information stored. If the information matches, then the user's firm credentials are verified.

Credentials not Verified.

Deny Account, Notify User.

If the credentials are not verified 220, then the account is denied, and the user is notified of the denied account 222.

Credentials Verified.

Set Up Account at Data Providing System and Associate Account with Firm.

If the user's firm credentials are verified 220, then a data providing user account is set up for the user at the data providing system, for example, by storing account information of such account at the data providing system associated with a unique data providing user identifier, and the data providing user account is also associated with the corresponding firm identifier 230. In one embodiment, the process of verifying firm credentials and registering users is an independently operating process as shown by the dashed lines in the Figure.

Set Up Validated Connections Between Matching System and Data Providing Systems, and Between Matching System and Data Consolidating Systems.

One or more validated connections are established 232 between a matching system and any data providing systems and/or data consolidating systems corresponding to the IP addresses included in the matching system's white list of IP addresses with which the matching is approved to communicate. In one embodiment, the connections are established and validated using conventional public and private key techniques and any certificates exchanged between the matching system and each respective data providing system and data consolidating system as part of step 208 above.

Receive Data Transfer Setup Request with Opaque User Identifier, Data Providing System Identifier from Data Consolidating System at Matching System Via Validated Connection.

Via a validated connection, a data transfer setup request is received 234 at the matching system from a data consolidating system as described in the related application with a data consolidating (DC) opaque user identifier and data providing system (DP) system identifier and user identifier. In one embodiment, the DC opaque user identifier is an identifier generated and stored at the data consolidating as described in the related applications, and the DC opaque user identifier corresponds to a data consolidating user at the data consolidating system.

At Matching System: Check IP Address, Check Validation, IP Address: On White List, not on Black List.

The IP address from which the data transfer setup request is received, and the certificate validation of such IP address, is checked at the matching system, and such IP address is also checked to verify that it is included in the IP address white list and is not included in the IP address black list 236. If the IP address is on neither list, the IP address may be investigated by a system administrator for addition to the white list. In one embodiment, the certificate validation of the IP address is also checked using the certificates exchanged between the matching system and requesting data consolidating system as part of step 208 and conventional public/private key techniques. The IP address white and black lists received and stored at the matching system as part of step 208 are used to check that the IP address of the requesting data consolidating system is included on the IP address white list and not included on the IP address black list. If all certificate(s) corresponding to the IP address are validated, and the IP address is included on the IP address white list and not included on the IP address black list, then the checks are approved at the matching system; otherwise, the checks are not approved at the matching system. In one embodiment, checking of black lists and white lists described herein may be performed by checking only one or the other color list.

If all Checks not Okay at Matching System.

Ignore Request and Indicate Error.

If any of all the checks performed at the matching system as part of step 236 are not approved at the matching system 238, then the data transfer setup request is ignored and an error is indicated 240. In one embodiment, the specific IP address check that failed may be indicated with the error, or no specifics may be indicated with the error.

If all Checks Okay at Matching System.

At Matching System, Send Request for Opaque User Identifier to Data Providing System with User Identifier.

If all of the checks performed at the matching system as part of step 236 are approved at the matching system 238, then the matching system sends a request for a data providing (DP) opaque user identifier to the data providing system specified in the received data transfer setup request, as described in the related applications 250. The request for the DP opaque user identifier may be sent along with the DP user identifier. In one embodiment, the matching system sends the request to the data providing system from an IP address included on the white list of approved IP addresses at the data providing system via the one or more validated connections set up between the matching system and data providing system as part of step 232. Opaque user identifiers are described in the related application.

At Data Providing System, Check IP Address, Validation, Authenticate User, Check Firm, User on White List and not on Black List.

The request for a DP opaque user identifier is received at the data providing system, the IP address of the requesting party is checked, along with the certificate validation of the IP address, an attempt is made to authenticate the data providing user corresponding to the received DP user identifier as described in the related application, the firm identifier associated with the DP user identifier is identified, and checks are performed to verify that the firm identifier is included in the firm white list at the data providing system, as well as to verify that the DP user identifier is not included in the user black list at the data providing system 252. In one embodiment, the IP address and certificate validation of the IP address of the matching system requesting the DP opaque identifier is identified and checked at the data providing system in a manner similar to the manner in which the data consolidating system's IP address and certificate validation information is checked at the matching as part of step 236 above. In one embodiment, user authentication of the user corresponding to the DP user identifier included in the received request is attempted, such as by using an out-of-band authentication method as described in the related application.

If all Checks not Okay at Data Providing System.

Ignore Request/Indicate Error.

If any of all the checks performed at step 252 above are failed or not approved at the data providing system 254, then the received request for a DP opaque user identifier is ignored at the data providing system, and an error is indicated to the requester via the matching system and data providing system 256.

If all Checks Okay at Data Providing System.

Data Providing System Sends, and Matching System Receives, Opaque User Identifier and Firm Identifier, and Matching System Checks IP Address and Certificate Validation.

If all of checks performed at step 252 above are passed or approved at the data providing system 254, then the requested DP opaque user identifier is provided by the data providing system to the matching system along with the associated firm identifier, and the matching system receiving such information checks the IP address from which it receives such information with the known IP address of the data providing system and checks the certificate validation corresponding to the IP address from which it is received using conventional public/private key techniques and any certificates exchanged between the two systems as described above 258. In one embodiment, the IP address check is passed or approved if the IP address from which the firm identifier and DP opaque user identifier are received matches the known IP address corresponding to the data providing system, and it is failed if the IP addresses do not match. Certificate validation may be performed as described above.

If any of all IP Address Checks not Okay at Matching System.

Ignore Response.

If any of all checks performed as part of step 258 are not passed or not approved 260, then the response received at the matching system is ignored 262.

If all IP Address Checks Okay at Matching System.

Matching System Stores Opaque User Identifiers, Data Providing and Data Consolidating Identifiers, and Firm Identifier.

If all checks performed as part of step 258 are passed and approved 260 at the matching system, then data transfer is setup as described in the related applications, and the received DP opaque user identifier, firm identifier, and DP system identifier are stored at the matching system associated with the DC opaque user identifier and DC system identifier corresponding to the initial request for data transfer setup 264.

Figure 3B:
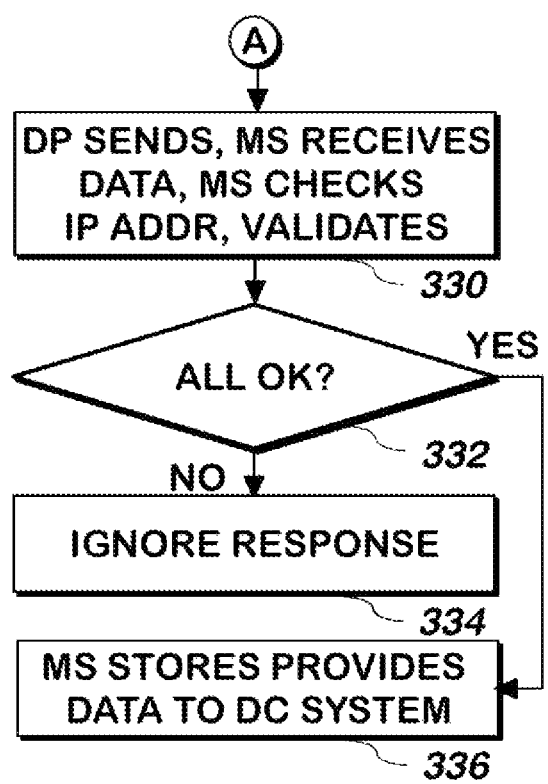
FIG. 3, consisting of FIGS. 3A and 3B, is a flowchart illustrating a method of securely transferring data according to one embodiment of the present invention.

FIG. 3, consisting of FIGS. 3A and 3B, is a flowchart illustrating a method of securely transferring data according to one embodiment of the present invention.

Receive Data Transfer Request with Data Consolidating Opaque User Identifier and Data Providing System Identifier from Data Consolidating System at Matching System Via Validated Connection.

Referring now to FIG. 3, a data transfer request is received 234 at the matching system, as described in the related application, from a data consolidating system via a validated connection established between the matching system and data consolidating system as described above, and the data transfer request received from the data consolidating system includes a DC opaque user identifier, DC system identifier and DP system identifier as described in the related applications 310.

At Matching System: Check IP Address, Check Certificate Validation, and Check IP Address, Firm Identifier, and Opaque User Identifier are all in Respective White Lists and not in Respective Black Lists.

The IP address from which the data transfer request is received and the certificate validation corresponding to the IP address are checked at the matching system as described above, and such IP address is also checked to verify that it is included in the IP address white list and is not included in the IP address black list 312. Additionally, the DP opaque user identifier and firm identifier stored at the matching system associated with the received DC opaque user identifier, DC system identifier and DP system identifier are identified, and the DP opaque user identifier and firm identifier are each checked to verify that the DP opaque user identifier is not included in the users black lists and the firm identifier is included in the firms white lists at the matching system 312.

In one embodiment, the certificate validation of the IP address is checked using the certificates exchanged between the matching system and requesting data consolidating system and conventional public/private key techniques. The IP address white and black lists received and stored at the matching system are used to check that the IP address of the requesting data consolidating system is included on the IP address white list and not included on the IP address black list. If certificate(s) corresponding to the IP address are validated, and the IP address is included on the IP address white list and not included on the IP address black list, then all the IP address checks are approved at the matching system; otherwise, the IP address checks are not approved at the matching system. In one embodiment, a request received from an IP address not on the white list or the black list may be allowed for a limited period of time if the certificate validation is successful and the system administrator is notified. The period of time allows the system administrators of the systems involved to verify the new IP address and add it to the IP address white list.

If any of all Checks not Okay at Matching System.

Ignore Request and Indicate Error

If any of all of the checks of step 312 at the matching system are not passed or not approved 314, then the request for data transfer is ignored and an error is indicated 316.

If all Checks Okay at Matching System.

At Matching System, Send Request for Data to Data Providing System with Data Providing Opaque User Identifier.

If all checks of step 312 are passed or approved at the matching system 314, then data is requested from the data providing system specified in the received request for data transfer, along with the DP opaque user identifier and firm identifier corresponding to such received request as described in the related applications 318.

At Data Providing System, Check IP Address, Validation.

When the data request, DP opaque user identifier, and firm identifier are received at the data providing system, the IP address of the matching system from which such data request is received and the certificate corresponding to the IP address are checked at the data providing system 320.

If any of all Checks not Okay at Data Providing System.

Ignore Request and Indicate Error.

If either the IP address or the certificate of the IP address from which the data request is received is checked and not approved 322, then the received data request is ignored and an error is indicated 324.

If all Checks Okay at Data Providing System.

Data Providing System Sends Data, and Matching System Receives Data and Checks IP Address and Validates.

If all checks performed at the data providing system as part of step 320 are passed or approved 322, then the requested data is provided by the data providing system to the matching system, and the matching system receiving such data checks the IP address from which the data is received 330. In one embodiment, the matching system checks the IP address from which it receives data by comparing such IP address with the known IP address for the data providing system from which it requested data, and it also attempts to validate the IP address from which it receives data using conventional public/private key techniques and any certificates exchanges between the matching system's IP address and the IP address from which it receives the data.

If any of all IP Address and Validation Checks not Okay at Matching System.

Ignore Response.

If any of all checks performed at the matching system as part of step 330 are not passed or approved 332, then the response is ignored at the matching system 334.

If all IP Address and Validation Certificate Checks are Okay at Matching System.

Matching System Stores Data and Provides Data to Data Consolidating System.

If all the checks performed at the matching system as part of step 330 are passed or approved 332, then the data received from the data providing system is provided by the matching system to the data consolidating system from which the initial data transfer request was received above, and the data is also stored at the matching system associated with the DC opaque user identifier and DC system identifier corresponding to the data consolidating account(s) from which the initial data transfer request was received, and the DP opaque user identifier, firm identifier, and DP system identifier corresponding to the data providing account(s) from which the data was received as described in the related applications 336.

Figure 4:
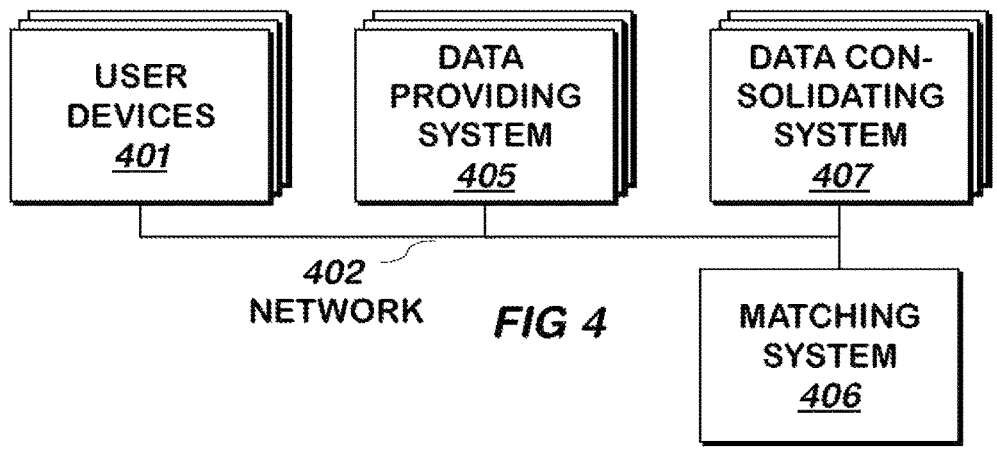
FIG. 4 is a block schematic diagram of a system for setting up secure data transfer and securely transferring data according to one embodiment of the present invention.

FIG. 4 is a block schematic diagram of a system for setting up secure data transfer and securely transferring data according to one embodiment of the present invention.

Figure 5:
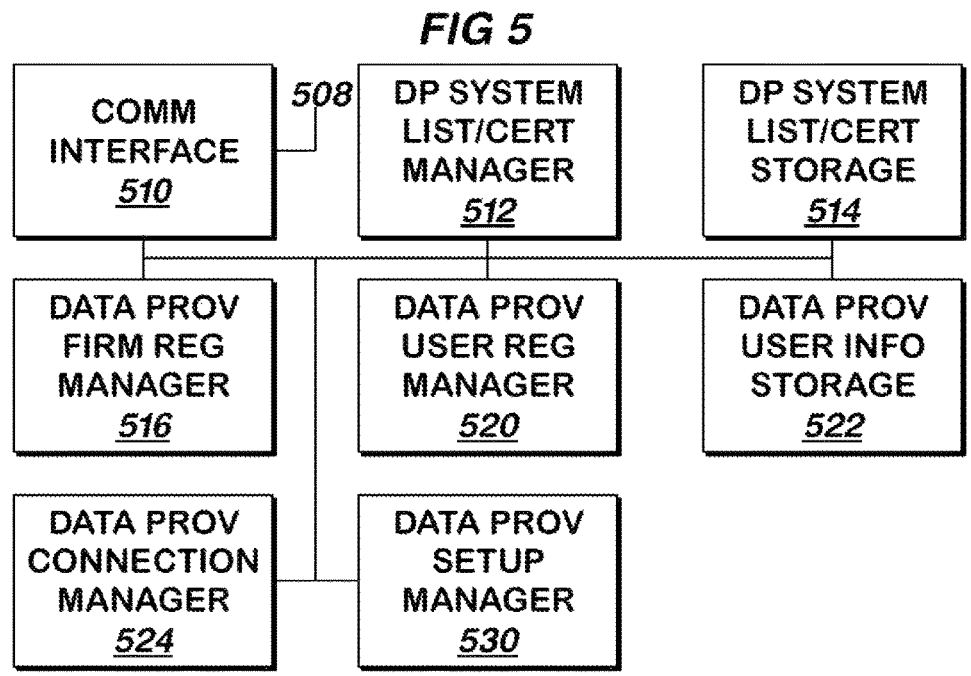
FIG. 5 is a block schematic diagram of data providing system 405 of FIG. 4 shown in more detail according to one embodiment of the present invention.

FIG. 5 is a block schematic diagram of data providing system 405 of FIG. 4 shown in more detail according to one embodiment of the present invention.

Figure 6:
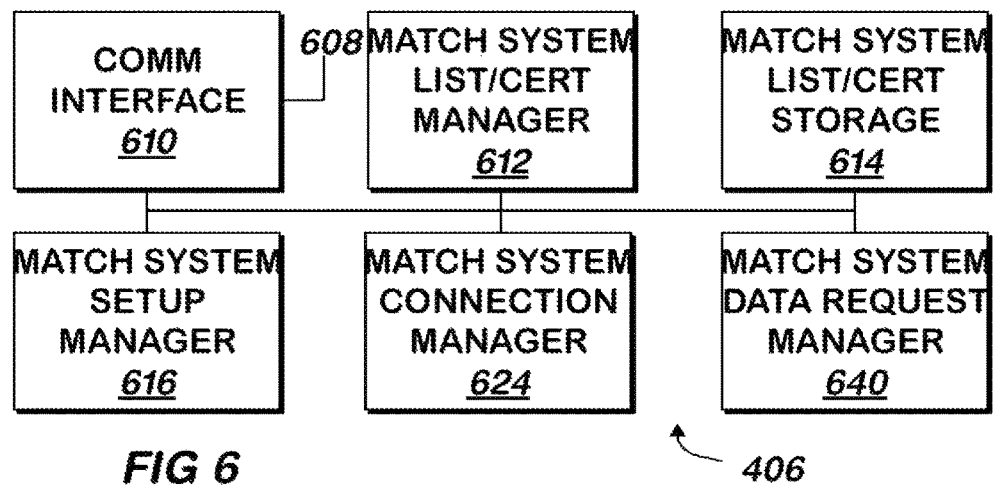
FIG. 6 is a block schematic diagram of matching system 406 of FIG. 4 shown in more detail according to one embodiment of the present invention.

FIG. 6 is a block schematic diagram of matching system 406 of FIG. 4 shown in more detail according to one embodiment of the present invention.

Figure 7:
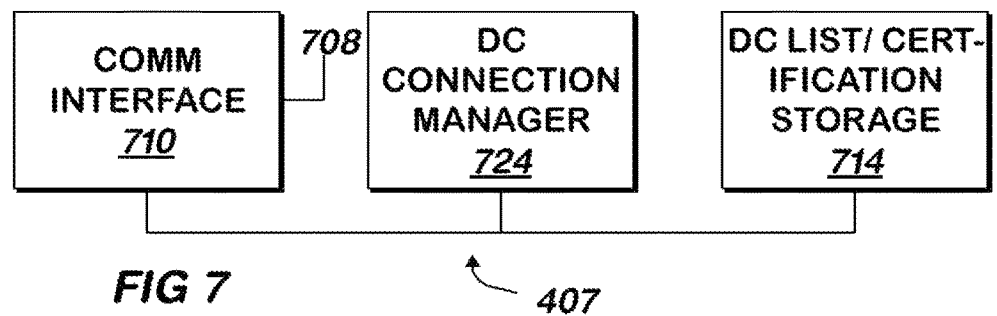
FIG. 7 is a block schematic diagram of data consolidating system 407 of FIG. 4 shown in more detail according to one embodiment of the present invention.

FIG. 7 is a block schematic diagram of data consolidating system 407 of FIG. 4 shown in more detail according to one embodiment of the present invention.

In one embodiment, the system of FIG. 4 contains any number of user devices 401, any number of data providing systems 405, a matching system 406, and any number of data consolidating systems 407, though other arrangements may be used. All systems operate as described herein and communicate via network 402, which may include a conventional Ethernet network, the Internet, or both.

Referring now to FIGS. 4, 5, 6, and 7, each system 401, 405, 406, and 407, includes a respective communication interface (not shown on system 401), 510, 610, 710, each of which may include a conventional communication interface running suitable communication protocols, such as Ethernet, TCP/IP, or both. In one embodiment, unless otherwise noted herein, all communication with each of the systems 401, 405, 406, 407, are made via its respective input/output (not shown on system 401), 508, 608, 708 of its respective communication interface (not shown on system 401), 510, 610, 710. In one embodiment, communication interface 510, 610, 710 at each of the respective systems 405, 406, 407 sends all communications it receives to its respective connection manager 524, 624, 724 for validation of the IP address from which such communication is received, and if it validates such IP address as described herein, then connection manager 524, 624, 724 forwards communications received from any validated IP address to other elements of its system as described in more detail above and below.

At matching system 406, matching system list/cert manager 612 receives IP address white list information and IP address black list information, described above, such as from a system administrator, and matching system list/cert manager 612 stores the IP address white list and black list information in matching system list/cert storage 614. In one embodiment, IP address white list information includes the IP address(es) of all data providing systems 405 and data consolidating systems 407 with which the matching system 406 is approved to communicate. IP address white and black list information or updated IP address white and black list information may be received by matching system list/cert manager 612 and stored in matching system list/cert storage 614 at any time.

At each data providing system 405, data providing list/cert manager 512 also receives IP address white list and IP address black list information, such as from a system administrator, and data providing list/cert manager 512 stores the received IP address list information in data providing system list/cert storage 514. In one embodiment, IP address white and black list information received by data providing list/cert manager 512 at any data providing system 405 may include the IP address(es) of each matching system with which such data providing system 405 is approved to communicate, as described above. IP address white list and IP address black list information or updated IP address white list and IP address black list information may be received at any number of data providing systems 405 at any time as described above.

Matching system list/cert manager 612 exchanges conventional public/private key security certificates with data providing list/cert manager 512 of each data providing system 405 with which it is approved to communicate, including each data providing system 405 for which an approved IP address is received as part of IP address white list information, as described above. Matching system stores any certificate information exchanged with data providing list/cert manager 512 in matching system list/cert storage 614 associated with the IP address of the data providing system 405 for which the certificate(s) are applicable. Data providing list/cert manager 512 also stores any exchanged certificate information in its respective data providing list/cert storage 514 associated with the IP address of the matching system 406 for which the certificate(s) are applicable.

Matching system list/cert manager 612 also exchanges security certificates with data consolidating list/cert manager 712 of each data consolidating system 407 with which matching system 406 is approved to communicate, as described above. Matching system list/cert manager 612 stores any exchanged certificate information in matching system list/cert storage 614 associated with the corresponding IP address of the data consolidating system 407, and data consolidating list/cert manager 712 may store the exchanged certificate information in and data consolidating list/cert storage 714 associated with the IP address of the matching system 406.

At each data providing system 405, data providing firm registration manager 516 may receive firm registration information, described above, from any number of firms at any time, and data providing firm registration manager 516 provides credentials information, described above, to any registering firms. When data providing firm registration manager 516 receives firm registration information corresponding to a firm, it stores the received firm registration information in data providing list/cert storage 514 associated with a firm identifier, and also stores the firm credentials it provided to the firm in response to the firm's registration.

At any time, data providing list/cert manager 512 receives user black list information corresponding to the matching system 406, described above, such as from a system administrator, and data providing list/cert manager 512 stores the user black list information in data providing list/cert storage 514 associated with the matching system identifier corresponding to the matching system for which the user black list information is received.

Data providing list/cert manager 512 and matching system list/cert manager 612 synchronize any changes to any white list and/or black list information corresponding to the two systems 405 and 406, such as the user black list information described above and/or firm white list information described above and below, and store any synchronized changes in data providing list/cert storage 514 and matching system list/cert storage 614, respectively.

A user may register at a data providing system 405 by providing user registration information including a data providing user identifier and password and optional firm identifier and corresponding firm credentials or password as described above. In one embodiment, data providing user registration manager 520 provides suitable user interface elements to allow the user to provide the user registration information, which the user provides, and data providing user registration manager 520 receives. If data providing user registration manager 520 receives the optional firm identifier and firm credentials, it attempts to verify the received firm credentials by comparing the firm credentials received with the firm credentials stored in data providing list/cert storage 514. The credentials may be verified if the firm credentials received match the ones stored as described above.

If data providing user registration manager 520 determines that the firm credentials are not verified, as described above, it may deny the account and send notification to the user at the user's user device 410 that firm credentials are not verified as described above. In one embodiment, a user need not provide firm credentials when registering, or firm credentials provided by the user may not be verified, and data providing user registration manager 520 may set up a user account for the user and store such account in data providing user information storage 522 associated with a data providing user identifier and not associated with any firm identifier.

If data providing user registration manager 520 determines that optionally provided firm credentials are verified as described above, it sets up the account as described above and stores the account information received from the user in data providing user information storage 522 associated with the user identifier and firm identifier as described above. Any number of users may register at any number of data providing systems 405 at any time.

Matching system connection manager 624 sets up one or more validated connections with each of any data providing systems 405 and data consolidating systems 407 with which the matching system 406 is approved to communicate. To establish an authenticated connection with another system, such as a data providing system 405 with which it is approved to communicate, matching system connection manager 624 compares the IP address of the data providing system 405 with the IP address white list and black list information stored in matching system list/cert storage 614, and also checks any public/private key certificates stored in matching system list/cert storage 614 for such IP address, and attempts to validate the IP address of the data providing system 405. If the IP address of the data providing system 405 is included in the IP address white list and not included in the IP address black list in matching system list/cert storage 614, and matching system connection manager 624 validates the security certificates stored for such IP address in matching system list/cert storage 614 as described above, then it determines that all checks for the IP address are passed and establishes the validated connection with the data providing system 405 as described above. If matching system connection manager 624 determines that any checks for the IP address performed as described above are failed, it may report an error message and/or not set up the validated connection as described above.

Reciprocally, data providing connection manager 524 checks the IP address of the matching system 406 with the IP address white list and black list information in data providing list/cert storage 514, and validates any corresponding security certificates in data providing list/cert storage 514, and sets up the validated connection or reports an error message as described above.

Matching system connection manager 624 may establish an authenticated connection with any number of data providing systems 405 in such a manner, and matching system connection manager 624 may also establish an authenticated connection with any number of data consolidating systems 407 in a similar manner.

As described above, data providing connection manager 524, matching system connection manager 624, and data consolidating connection manager 724 each receive all communications via their respective communication interfaces 510, 610, and 710 and check IP address information, IP address certificate validation, and IP address white and/or black list information and for all communications received, and forward such received communications to other elements of its same system only if all checks are passed. In one embodiment, connection manager 524, 624, 724 of each respective system 405, 406, 407 identifies the type of any communication it receives, as specified by the entity originating such communication, and if all checks are passed as described herein, connection manager 524, 624, 724 forwards the received communication to a designated element or elements of its respective system based on the identified type of communication, and such element(s) receive the forwarded communication as described below. If connection manager 524, 624, 724 determines that all checks are not passed for any communication it receives, it does not forward such received communication.

The connections over which any further communications received at any element of a system 405, 406, 407 as described herein via an established validated connection are validated by the respective connection manager 524, 624, and 724 at the system which the information is received as described herein.

At any time, once a validated connection has been set up between a matching system 406 and a data consolidating system 407 as described above, matching system connection manager 624 may receive a data transfer setup request from a data consolidating system 407 including a DC opaque user identifier, DP system identifier, and a DP user identifier, as described in the related applications. Matching system connection manager 624 performs all checks to validate the IP address from which the data transfer setup request is received, as described above, to establish the validated connection, and if all checks are passed as described above, system connection manager 624 identifies the type of the received communication as a data transfer setup request via a field in the communication, and forwards the data transfer request to matching system setup manager 616.

Matching system setup manager 616 receives the data transfer setup request, identifies the validated connection corresponding to the received DP system identifier, and sends a request for a DP opaque user identifier, as described in the related applications, to data providing system setup manager 530 via the identified validated connection. In one embodiment, matching system setup manager 616 sends the request with the received DP user identifier.

Data providing connection manager 524 receives the DP user identifier and request for a DP opaque user identifier, and checks and validates the IP address from which such request is received as described above. If data providing connection manager 524 determines that all checks are passed as described above, it uses a field in the communication to identify the type of the communication received as a request for a DP opaque user identifier and forwards the received DP user identifier and request for a DP opaque user identifier to data providing setup manager 530. If data providing connection manager 524 determines that any checks are failed as described above, it does not forward the communications to data providing system setup manager 530, and may return an error message to the sender, which may inform the user requesting the setup of data transfer.

When data providing setup manager 530 receives the DP user identifier and request for a DP opaque user identifier from an authenticated sender as described above, it generates or identifies the requested DP opaque user identifier as described in the related applications, and sends the DP opaque user identifier, along with any firm identifier associated with the DP user identifier, to matching system setup manager 616 in response to its request.

Matching system setup manager 616 receives the response from data providing setup manager 530, and matching system setup manager 616 stores the received response, including the received DP opaque user identifier and firm identifier, in matching system user information storage 622 along with the DP system identifier corresponding to the data providing system 405 from which the response is received and the DC opaque user identifier and DC system identifier corresponding to the data consolidating system 407 and data consolidating user from which the initial request to set up data transfer was received.

At any time, matching system 406 may receive a request for data with a DC opaque user identifier and DP system identifier from a data consolidating system 407. The process described above is repeated for such request. If matching system connection manager 624 does not validate any received communication, it does not forward the request for data may indicate an error to the user at the data consolidating system 407 as described above. If matching system connection manager 624 validates a received communication and identifies the type of the communication received as a request for data, matching system connection manager 624 forwards the request for data to matching system data request manager 640.

Matching system data request manager 640 receives the request for data and determines whether data transfer has been previously setup and is approved for the received DC opaque user identifier and DP system identifier in the manner described above. In one embodiment, to make this determination, matching system data request manager 640 checks matching system user information storage 622 for a DP opaque user identifier and optional firm identifier stored associated with the received DC opaque user identifier and DP system identifier. If matching system data request manager 640 determines that data transfer has not been set up and approved for the received DC opaque user identifier and DP system identifier, it may ignore the request for data or indicate an error as described above and in the related applications.

If matching system data request manager 640 determines that data transfer has been set up for the received DC opaque user identifier and DP system identifier, it sends the request for data to data providing system 405 corresponding to the received DP system identifier. In one embodiment, matching system data request manager 640 sends the request for data with the DP opaque user identifier, and optionally the firm identifier, which corresponds to the received DC opaque user identifier and DP system identifier in matching system user information storage 622. Matching system data request manager 640 may also include the DC system identifier corresponding to the data consolidating system 407 from which the request for data was received.

The process described above is repeated in response to the request for data being received. If all checks performed corresponding to the IP address and connection of the matching system 406 from which the request for data is received are not passed as described above, the request for data is ignored and/or an error is indicated at the data providing system 405 as described above.

If all checks are passed corresponding to the IP address and connection of the matching system 406 from which the request for data is received as described above, data providing data request manager 540 receives the request for data, including the DP opaque user identifier, DC system identifier and optional firm identifier, and provides the requested data to the requesting matching system 406 as described above and in the related applications. In one embodiment, data providing data request manager 540 provides the requested data with the DP opaque user identifier, DC system identifier and optional firm identifier with which it received the request for data.

Matching system connection manager 624 checks the IP address and connection of the data providing system 405 from which the data is received as described above, and if all checks are passed, matching system data request manager 640 provides the received data to data consolidating system 407 for which the data was received as described above and in the related applications. In one embodiment, matching system data request manager 640 identifies the DC opaque user identifier corresponding to the DP opaque user identifier, DC system identifier and optional firm identifier received with the data, and provides the data to data consolidating system 407 corresponding to the received DC system identifier. Data consolidating system 407 receives any data provided by matching system as described in the related applications.

What is claimed is:

1. A method of providing data of a user stored on a data providing computer system to a data consolidating computer system, the method comprising:

receiving from the data consolidating computer system from which an indication was previously received that the user had proved an association with one of a plurality of firms with which data consolidating computer system the user is able to prove an association and on which the user has a first user identifier, at a matching system, a second user identifier that also identifies the user on the data consolidating computer system, and that is different from the first user identifier of the user, and that cannot be used to log the user into the data consolidating computer system, over a first communication facility that is verified by the matching system to be coupled to the data consolidating computer system;

checking at the matching system a validity of the user and the firm with which the user had proved the association; and responsive to the checking step:
converting by the matching system, the second user identifier into a third user identifier of the user on the data providing computer system that was previously provided by the data providing computer system to the matching system and identifies the user on the data providing computer system and that cannot be used to log the user into the data providing computer system on which the user has a fourth user identifier; and providing the third user identifier by the matching system to the data providing computer system over a second communication facility coupled to the matching system that is verified by the data providing computer system;

receiving data of the user from the data providing computer system over the second communication facility responsive to the third user identifier provided; and providing the data of the user received to the data consolidating computer system associated with the second user identifier.

2. The method of claim 1, wherein the first and second communication facilities are verified using a secure connection.

3. The method of claim 1 wherein the first and second communication facilities are verified using a whitelist, blacklist or both, of identifiers of at least one computer system.

4. The method of claim 1, wherein the checking step comprises checking the second user identifier that cannot be used to log the user into the data consolidating computer system but is sent by the data consolidating computer system against at least one selected from a group comprising a whitelist and a blacklist.

5. The method of claim 1 wherein the association with the firm was proven via a firm password.

6. The method of claim 1, wherein the checking step comprises:
receiving from the data consolidating computer system an identifier of the firm with which the user had proved the association and a list of approved firms; and
comparing the identifier of the firm with which the user had proved the association with the list of approved firms.

7. The method of claim 1, wherein either the data consolidating computer system or the data providing computer system, but not both, comprises the matching system.

8. A computer program product comprising a nontransitory computer useable medium having computer readable program code embodied therein for providing data of a user stored on a data providing computer system to a data consolidating computer system, the computer program product comprising computer readable program code devices configured to cause a computer system to:
receive from the data consolidating computer system from which an indication was previously received that the user had proved an association with one of a plurality of firms with which data consolidating computer system the user is able to prove an association and on which the user has a first user identifier, at a matching system, a second user identifier that also identifies the user on the data consolidating computer system, and that is different from the first user identifier of the user, and that cannot be used to log the user into the data consolidating computer system, over a first communication facility that is verified by the matching system to be coupled to the data consolidating computer system;

check at the matching system a validity of the user and the firm with which the user had proved the association; and responsive to the computer readable program code devices configured to cause the computer system to check:
convert by the matching system, the second user identifier into a third user identifier of the user on the data providing computer system that was previously provided by the data providing computer system to the matching system and identifies the user on the data providing computer system and that cannot be used to log the user into the data providing computer system on which the user has a fourth user identifier; and provide the third user identifier by the matching system to the data providing computer system over a second communication facility coupled to the matching system that is verified by the data providing computer system;

receiving data of the user from the data providing computer system over the second communication facility responsive to the third user identifier provided; and provide the data of the user received to the data consolidating computer system associated with the second user identifier.

9. The computer program product of claim 8, wherein the first and second communication facilities are verified using a secure connection.

10. The computer program product of claim 8 wherein the first and second communication facilities are verified using a whitelist, blacklist or both, of identifiers of at least one computer system.

11. The computer program product of claim 8, wherein the computer readable program code devices configured to cause the computer system to check comprises computer readable program code devices configured to cause the computer system to check the second user identifier that cannot be used to log the user into the data consolidating computer system but is sent by the data consolidating computer system against at least one selected from a group comprising a whitelist and a blacklist.

12. The computer program product of claim 8 wherein the association with the firm was proven via a firm password.

13. The computer program product of claim 8, wherein the computer readable program code devices configured to cause the computer system to check comprises computer readable program code devices configured to cause the computer system to:
receive from the data consolidating computer system an identifier of the firm with which the user had proved the association and a list of approved firms; and
compare the identifier of the firm with which the user had proved the association with the list of approved firms.

14. The computer program product of claim 8, wherein either the data consolidating computer system or the data providing computer system, but not both, comprises the matching system.

* * * * *